Dec. 17, 1946. G. H. RIDINGS ET AL Re 22,819

FACSIMILE TELEGRAPH SYSTEM AND APPARATUS

Original Filed June 4, 1942 7 Sheets-Sheet 1

INVENTORS
G. H. RIDINGS
R. J. WISE
BY
George J. Craig
ATTORNEY

Dec. 17, 1946. G. H. RIDINGS ET AL Re 22,819

FACSIMILE TELEGRAPH SYSTEM AND APPARATUS

Original Filed June 4, 1942 7 Sheets-Sheet 2

INVENTORS
G. H. RIDINGS
R. J. WISE
BY
George T. Craig
ATTORNEY

Dec. 17, 1946. G. H. RIDINGS ET AL Re 22,819

FACSIMILE TELEGRAPH SYSTEM AND APPARATUS

Original Filed June 4, 1942 7 Sheets-Sheet 3

INVENTORS
G. H. RIDINGS
R. J. WISE
BY
George J. Craig
ATTORNEY

FACSIMILE TELEGRAPH SYSTEM AND APPARATUS

Original Filed June 4, 1942 7 Sheets-Sheet 4

INVENTORS
G. H. RIDINGS
R. J. WISE
BY George T. Craig
ATTORNEY

FACSIMILE TELEGRAPH SYSTEM AND APPARATUS

Original Filed June 4, 1942 7 Sheets-Sheet 5

INVENTORS
G. H. RIDINGS
R. J. WISE
BY George T. Craig
ATTORNEY

FACSIMILE TELEGRAPH SYSTEM AND APPARATUS

Original Filed June 4, 1942 7 Sheets-Sheet 6

INVENTORS
G. H. RIDINGS
R. J. WISE
BY George T. Craig
ATTORNEY

FACSIMILE TELEGRAPH SYSTEM AND APPARATUS

Original Filed June 4, 1942 7 Sheets-Sheet 7

INVENTORS
G. H. RIDINGS
R. J. WISE
BY George T. Craig
ATTORNEY

Reissued Dec. 17, 1946

Re. 22,819

UNITED STATES PATENT OFFICE 22,819

FACSIMILE TELEGRAPH SYSTEM AND APPARATUS

Garvice H. Ridings, Summit, and Raleigh J. Wise, Dunellen, N. J., assignors to The Western Union Telegraph Company, New York, N. Y., a corporation of New York Original No. 2,386,263, dated October 9, 1945, Serial No. 445,690, June 4, 1942. Application for reissue July 18, 1946, Serial No. 684,420

19 Claims. (Cl. 178—6.6)

This invention relates to automatic facsimile telegraph systems and apparatus, and has particular reference to a facsimile telegraph system in which means are provided for selecting a desired automatic recorder and transmitting a message or plurality of messages thereto.

The novel system disclosed hereinafter as an important part of the present invention comprises a transmitter station employing an automatic facsimile transmitter and a plurality of receiver stations each employing an automatic self-loading recorder. The system is so arranged that any one of these recorders may be selected for reception of a message from the transmitter, and means are provided for automatically sending one or more copies of the message. A signaling device is included at each receiver station for sending to the transmitter station a predetermined identifying code to notify the operator at the transmitter station of the selection of the desired receiver station. This return or answer-back signal is or may be modified to indicate to the operator at the transmitter station that a previously transmitted message has been received by the proper person. It will be understood that the term "message" as used herein may refer to written or printed matter, pictures and drawings, or any other subject matter to be reproduced by the facsimile process. The system of this invention is particularly useful for railroad dispatching service, but its usefulness is not limited to this particular field.

An object of the present invention is to provide for transmission from an automatic transmitter to one of a plurality of automatic self-loading recorders, this communication being obtained by a selective process.

A further object is to provide an improved automatic facsimile telegraph receiver capable of being selected for communication purposes and of being controlled from a remote point such, for example, as a transmitter station.

Still another object is to provide an answer-back arrangement whereby a selected receiver station automatically transmits a set of predetermined identifying signals.

Still another object of the present invention is to modify the answer-back signal so as to furnish information to the operator at the transmitter station.

Still another object of the present invention is to provide for predetermining the number of times transmission of a given message will be automatically repeated.

These and other objects will be apparent to those skilled in the art and are accomplished by the present invention, one embodiment of which is illustrated in the accompanying drawings, in which.

Figure 1:
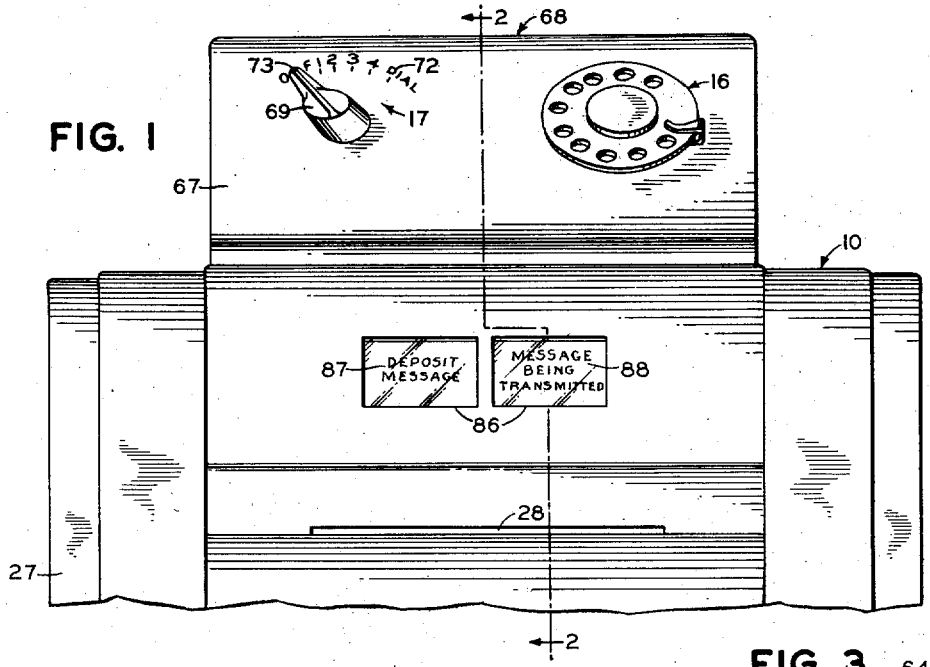
Fig. 1 is a fragmentary front elevation of a facsimile transmitter for use in the system of this invention.
Figure 3:
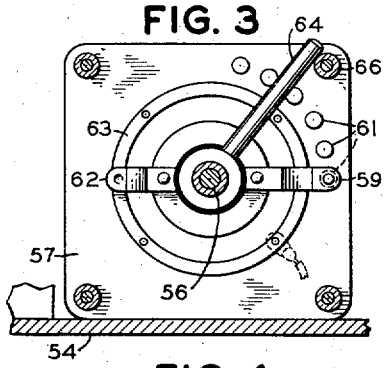
Fig. 3 is an enlarged partial sectional view on line 3—3 of Fig. 2.
Figure 2:
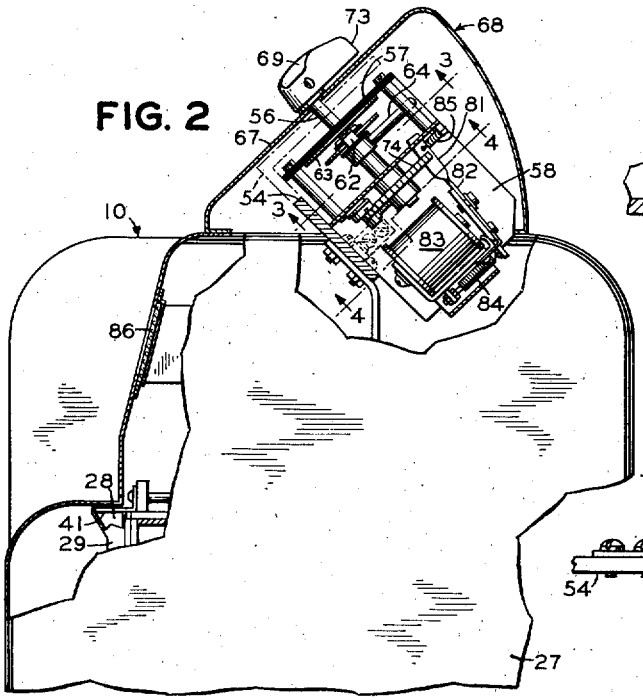
Fig. 2 is a fragmentary transverse section on line 2—2 of Fig. 1, looking in the direction of the arrows.
Figure 4:
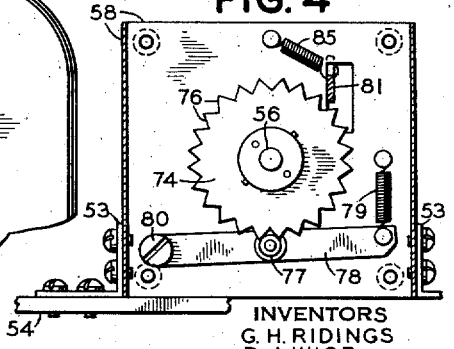
Fig. 4 is an enlarged partial sectional view on line 4—4 of Fig. 2.
Figure 12:
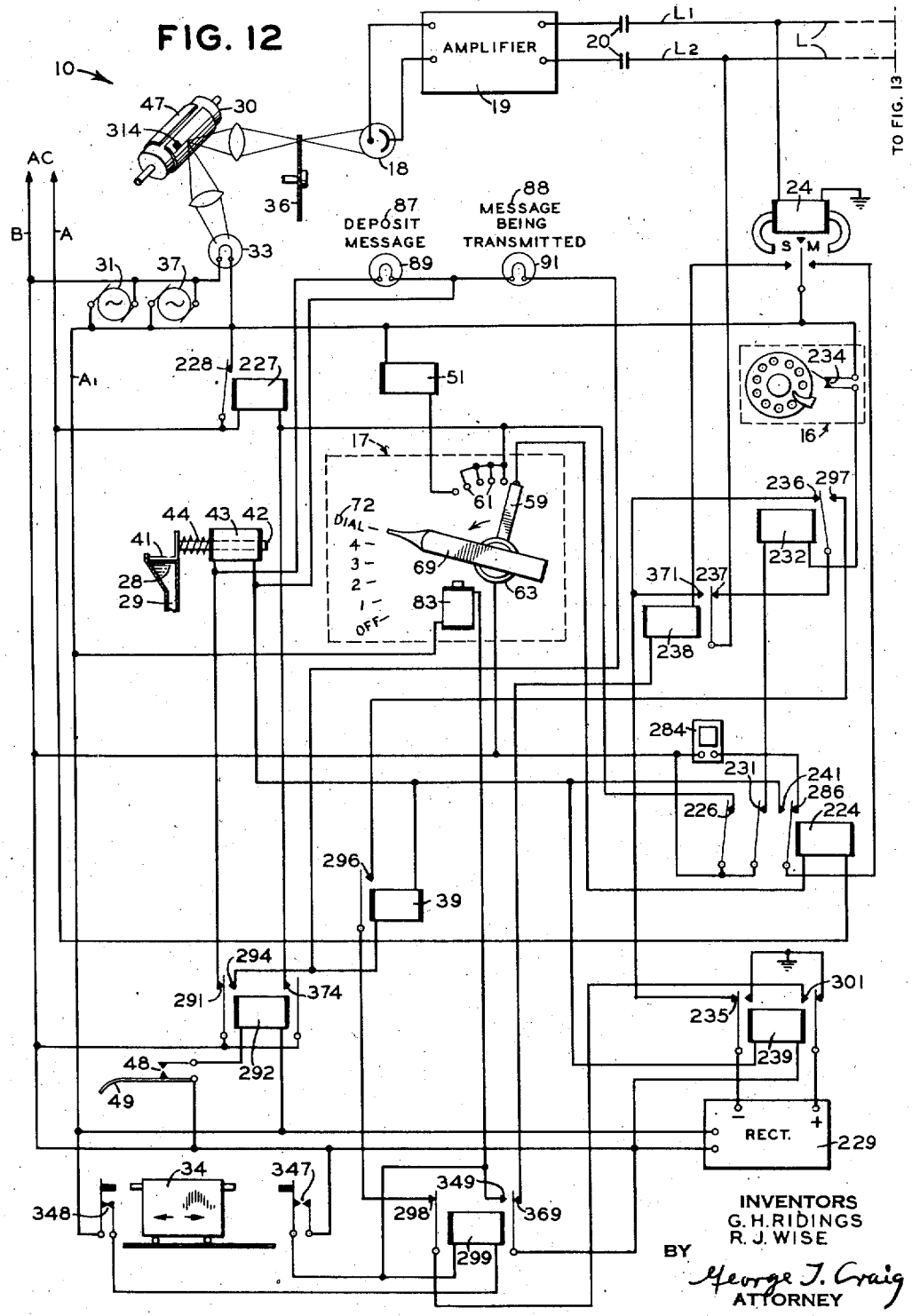
Fig. 12 is a wiring diagram showing one circuit arrangement for a transmitter adapted to control the selection and operation of any one of a number of receivers from the transmitting end of a communication circuit.
Figure 13:
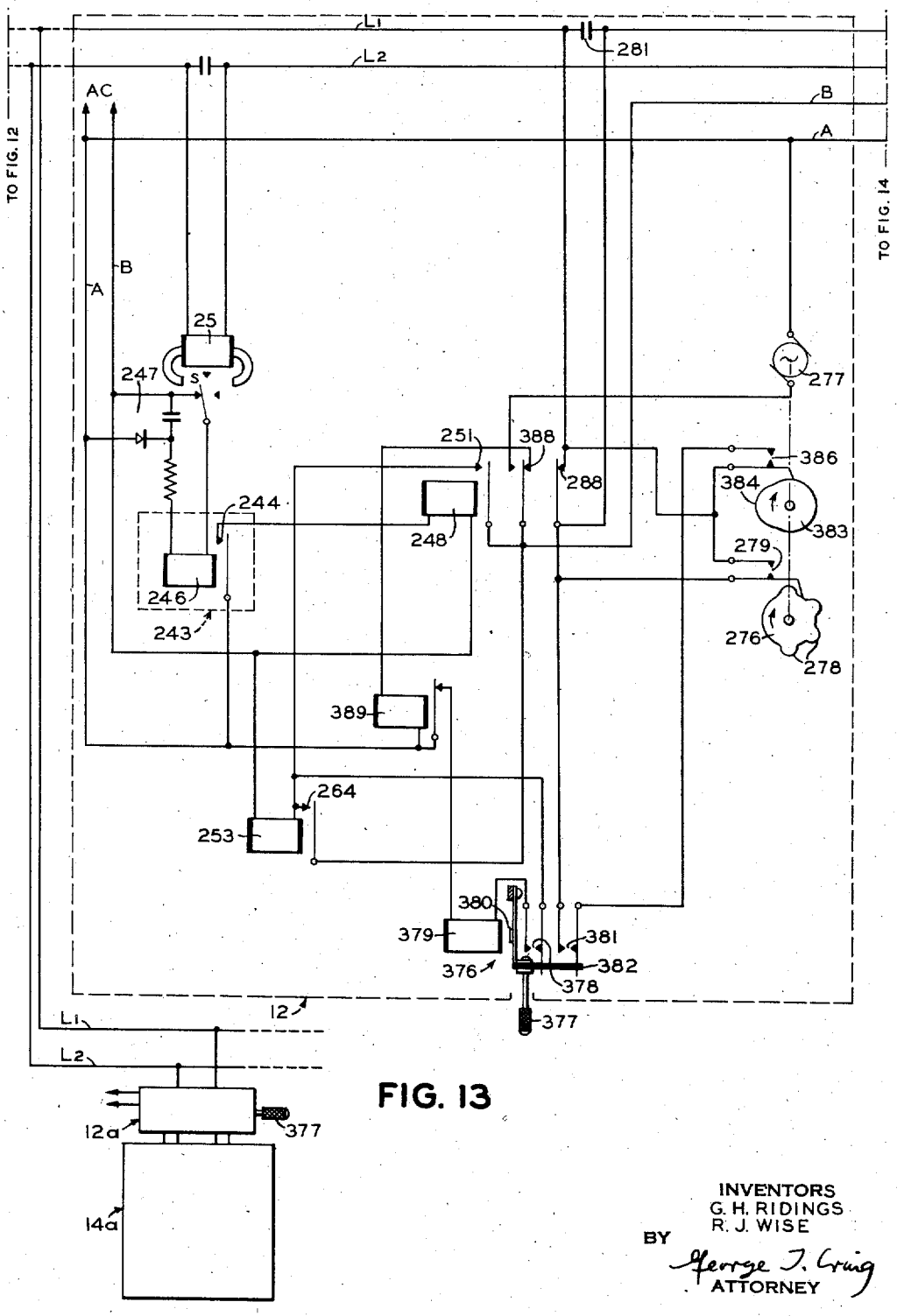
Fig. 13 is a wiring diagram showing one circuit arrangement for selecting and conditioning a receiver for operation.

The system of this invention comprises a transmitting station employing a transmitter 10 (Figs. 1, 2 and 12), a communication circuit L composed of line conductors L1 and L2, a plurality of receiving stations at each of which is a selector and control mechanism 12, diagrammatically shown by Fig. 13, and a recorder 14, the essential mechanical parts and electrical wiring of which are shown by Figs. 5 to 10 and 14. The transmitter may be installed at any point on a railroad line, for example, in the dispatcher's office or in a railroad station, and the recorders may be placed in small, weather-proof houses along the railroad line at varying distances from the transmitter. The transmitter 10 in the illustrative embodiment of the system is similar to the self-loading transmitter disclosed in Patent No. 2,262,715, granted to R. J. Wise et al. on November 11, 1941. The transmitting station is provided with a conventional impulse dialing mechanism 16, which is common in telephone practice, and a special rotary switch 17, shown in Figs. 1 to 4, for rendering the dialing mechanism effective and for predetermining the number of copies which are to be automatically transmitted to a recorder selected by manipulation of the dial 16. The recorder 14 may be similar to the recorder disclosed in the copending application of R. J. Wise et al., Serial No. 389,164, filed April 18, 1941. The structural and circuit details of the recorder not disclosed at the present time by an issued patent will be described hereinafter for the sake of completeness of this disclosure.

The conductors L1 and L2 of the communication circuit L are used simultaneously for the transmission of alternating current facsimile signals or message impulses, and, also, the direct current control signals by which the selection of the recorder and the operation of the transmitting and recording apparatus is controlled. The facsimile signals originate in the transmitter at the photoelectric cell 18 (Fig. 12) which is connected to an amplifier 19, the output circuit of which is connected through a pair of blocking condensers 20 to the conductors L1 and L2. The purpose of the blocking condensers is to isolate the alternating current facsimile signals from the direct current control signals. At the receiving station the line conductors are connected to a signal inverter 21 and an amplifier 22. A transformer 23 couples the amplifier to the recording circuit.

The polarity of the direct current potentials which are applied to the conductor L1 is controlled by apparatus at the receiving station for the purpose of operating a polar relay 24 connected to this conductor at the transmitting station. Similarly, the polarity of the direct current potentials, which are applied to the conductor L2, is controlled by the apparatus at the transmitting station for the purpose of operating a polar relay 25, forming a part of the selector apparatus, and a polar relay 26 of a selected receiver. Each of these polar relays is of the three-position type whereby the tongue is moved to one extreme contact in response to one polarity of potential, to the other extreme contact in response to the opposite polarity of potential, and to a mid-position disengaged from both of the extreme contacts in response to a no-current condition.

Figure 14:
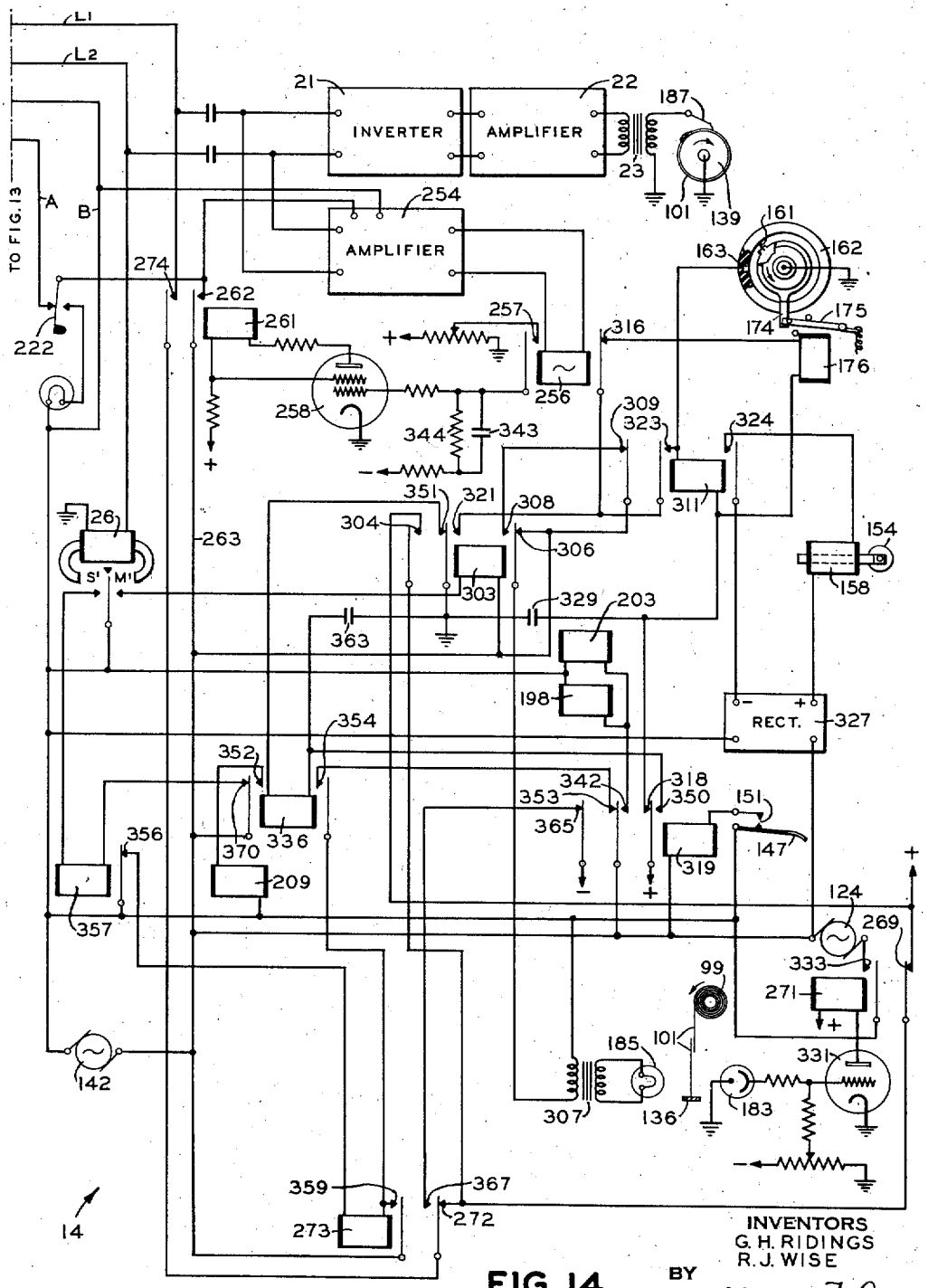
Fig. 14 is a wiring diagram showing one circuit arrangement for controlling and operating the receiver.

Although Figs. 13 and 14 of the drawings show only two recorders 14 and 14a, it will be understood that a number of separate recording stations, each provided with a selector mechanism 12, may normally be connected to a single communication circuit. The selector and control mechanism 12a associated with the recorder 14a is identical with the mechanism 12.

In the present invention, the transmitter 10 at the transmitting station is located in a box or housing 27 adapted to be mounted on any suitable support such, for example, as a wall or pedestal. The mechanical features and details of the transmitter selected for purposes of illustration are similar to those disclosed and claimed in Patent No. 2,262,715, above-mentioned, and reference is made thereto for a detailed mechanical description. In the present disclosure, electrical circuit details necessary to a complete understanding of this invention are shown by Fig. 12. A slot 28 (Fig. 1), accessible from the front of the box 27, is connected with a chute 29 which extends to a point adjacent a message scanning cylinder 30 adapted to be driven through suitable gearing (not shown) by a synchronous or other speed-controlled motor 31. The scanning cylinder, the motor and the remaining parts of the transmitter mentioned hereinafter are diagrammatically shown in Fig. 12 of the drawings. The photocell 18, the exciter lamp 33 and the associated optical mechanism are mounted on a scanning carriage 34, which is movable longitudinally of the rotary cylinder 30 to scan a message thereon. A light chopper 36 driven by a motor 37 forms a part of the scanning mechanism.

The scanning carriage 34 is moved longitudinally of the cylinder 30 in any known manner by a rotary feed screw driven by the synchronous motor 31 and adapted to be connected to the carriage by a half-nut which is brought into engagement with the feed screw by the armature of the half-nut operating magnet 39. The slot 28 giving access to the chute 29 is normally closed by a closure slide 41 connected to the end of the armature 42 of a chute closure magnet 43. A spring 44 holds the slide in the chute closing position when the magnet is deenergized. The scanning cylinder 30 is preferably provided with a circumferential series of sheet holding teeth similar to the sheet holding teeth of the recorder shown in Figs. 5 and 6 of the drawings and the issued patent referred to above. These teeth engage a message sheet 47 fed downwardly through the chute 29 and cause it to be wrapped in position around the cylinder 30, as diagrammatically indicated in Fig. 12. As described in the above-mentioned patent, the sheet is preferably so formed as to require being inserted in the chute in the way necessary to insure its being properly positioned on the cylinder for correct transmission of the message subject matter. It will be understood, however, that any known means for securing the sheet on the cylinder 30 may be employed. When the sheet 47 is on the cylinder, it closes the contacts of a switch 48. When no message sheet is on the cylinder, the operating arm 49 for the switch 48 is accommodated by a groove in the cylinder 30.

Figure 5:
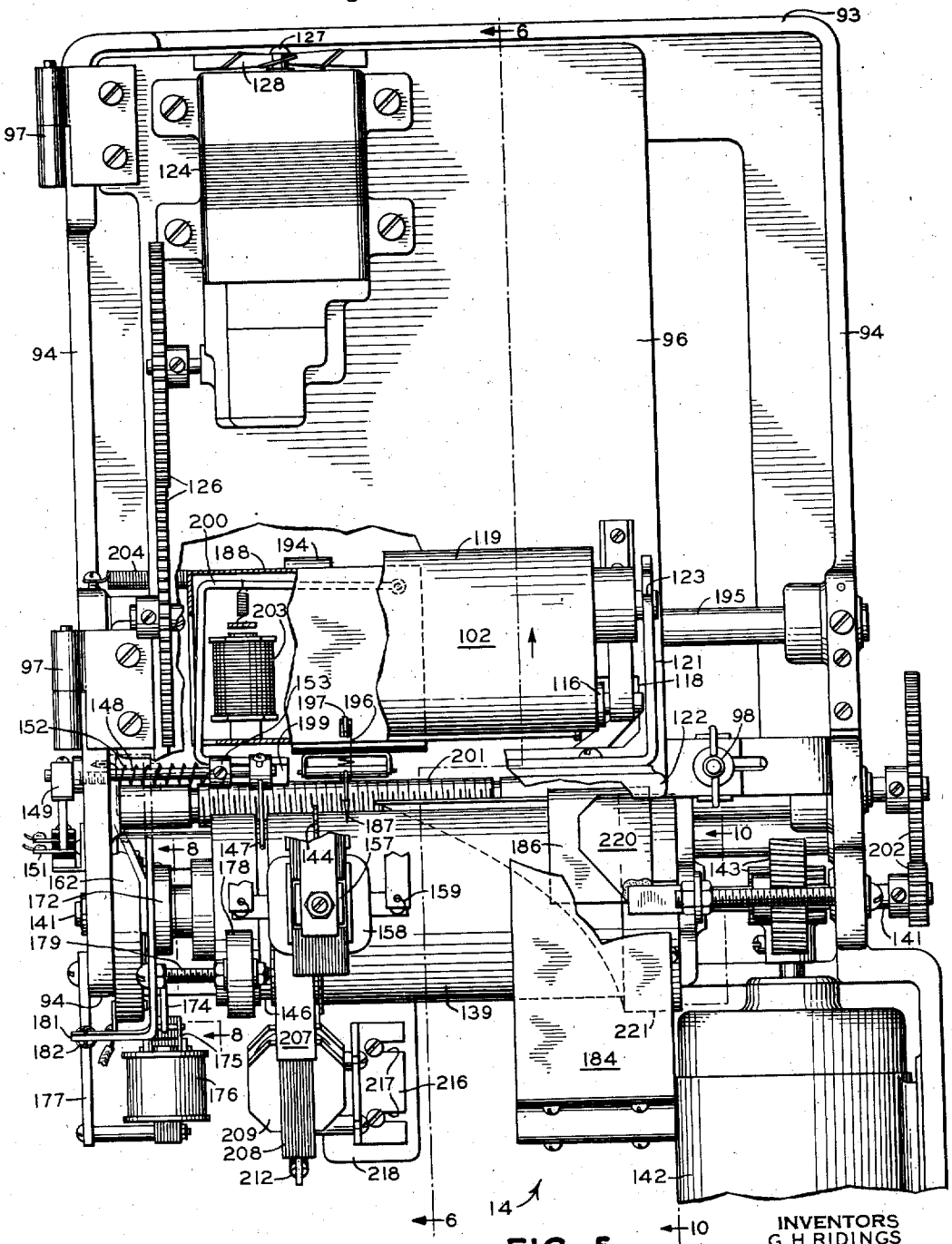
Fig. 5 is a view in front elevation of an automatic facsimile receiver for use in the system of this invention, certain of the parts being removed for the sake of clearness of illustration.
Figure 6:
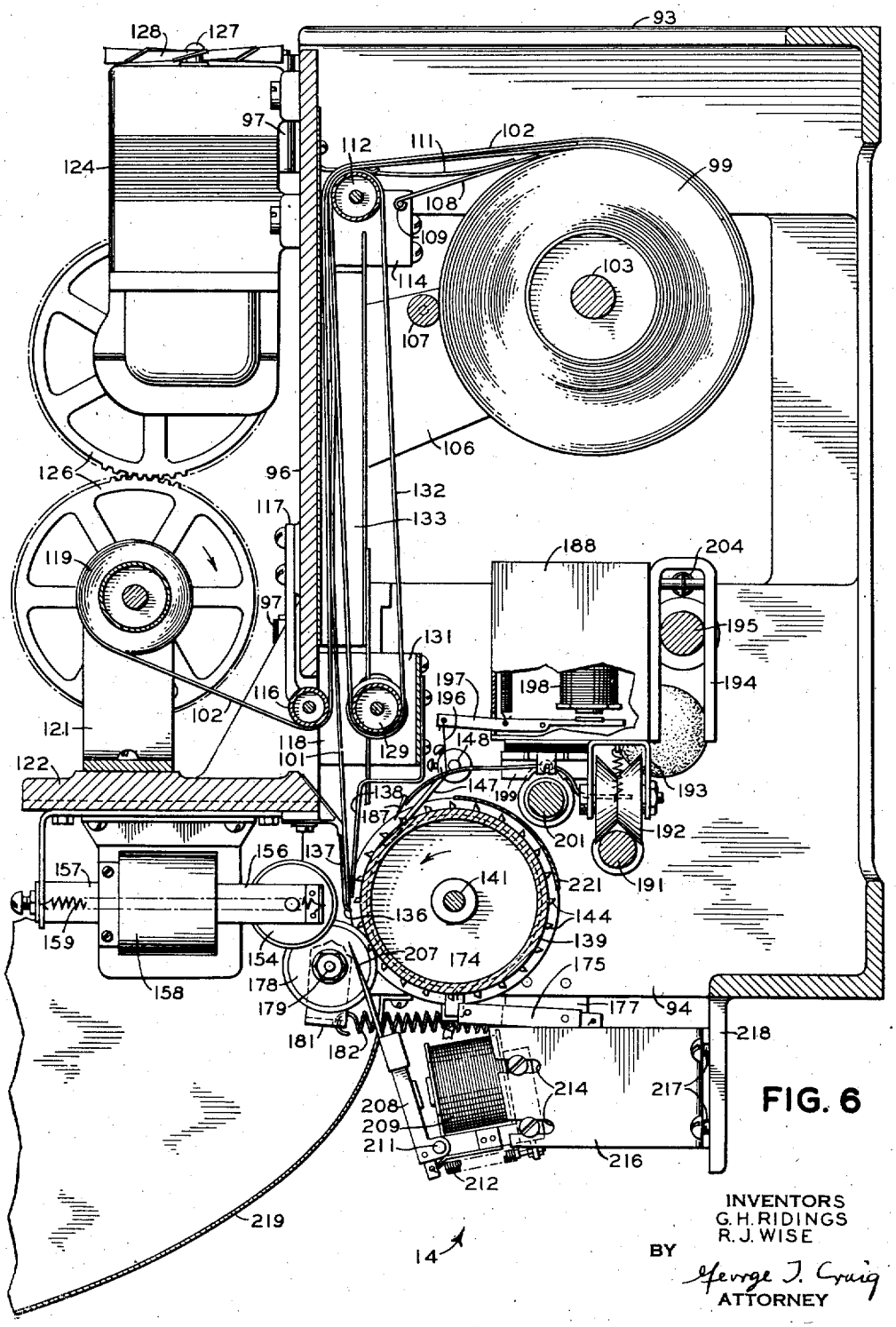
Fig. 6 is a transverse section on line 6—6 of Fig. 5, looking in the direction of the arrows.
Figure 7:
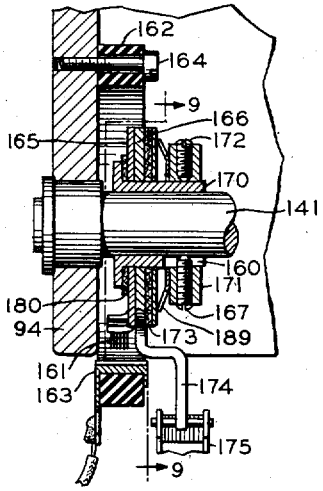
Fig. 7 is an enlarged fragmentary section on line 7—7 of Fig. 8 and illustrates a detail.
Figure 8:
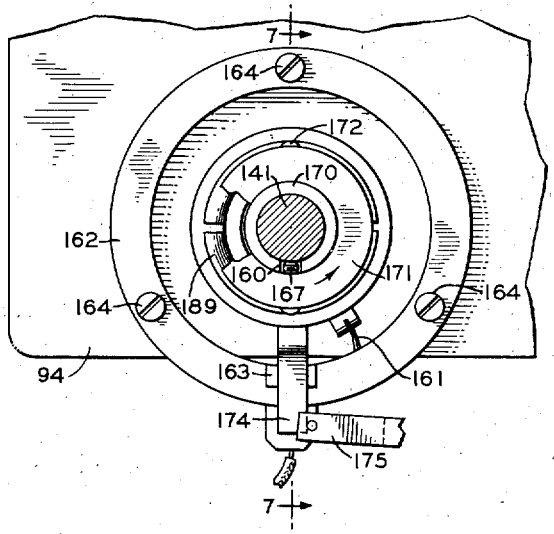
Fig. 8 is an enlarged fragmentary section on line 8—8 of Fig. 5.
Figure 9:
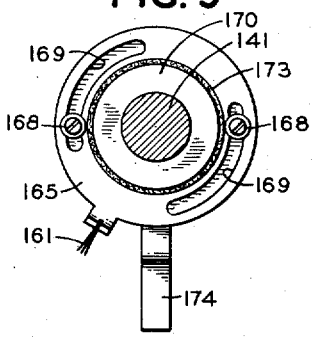
Fig. 9 is an enlarged fragmentary section on line 9—9 of Fig. 7.

When a message sheet on the cylinder 30 is to be removed, it is stripped from the cylinder by a stripper blade formed on or by the armature of a stripper magnet 51. Details of a similar stripper blade are illustrated by Figs. 5 and 6 of the drawings. The dimensions of the message sheet 47 are such that a gap is left between the edges of the sheet that is wrapped around the cylinder. The message sheet is stripped from the cylinder by energizing the magnet 51 which moves the stripper blade into position against the cylinder so that its edge slips under the edge of the message sheet and peels it from the cylinder. When peeled from the cylinder, the sheet preferably falls into a bin or the like where it remeans until collected by an authorized person having access to the bin through a locked closure or the like.

The copy selecting and starting switch 17 of the present invention provides a means for automatically transmitting a desired number of copies to a recorder selected by the dial mechanism 16 and the selector and control mechanism 12. The switch 17 is secured by lugs 53 to a channel member 54 carried by the frame of the transmitter 10.

A shaft 56, rotatably mounted in the top plate member 57 of insulating material and a bottom member 58, carries a bridging contact wiper arm 59 which engages a series of contact studs 61. A brush arm 62 slides on a collector ring 63 and is electrically connected to the wiper arm 59. The brush arm and wiper arm are insulated from the shaft as shown. The range of movement of the wiper arm is limited, in the illustrative embodiment, to six contact studs by a stop arm 64 which engages the posts 66 separating the plates 57 and 58. The upper portion of the shaft 56 projects above the sloping top 67 of a cover member 68 and is provided with an operating knob or handle 69. A dial in the form of appropriate markings 72 cooperates with a pointer 73 formed on the handle 69 or other suitable means to indicate the position of the wiper arm 59.

To provide for advancing the wiper arm 59 one step upon completion of a scanning operation, a ratchet wheel 74 having ratchet teeth 76 is secured to the shaft 56. A jockey roller 77 carried by an arm 78 pivoted at 80 is pressed into the notches between the ratchet teeth by a spring 79. The free end 81 of the pivoted armature 82 of a stepping magnet 83 is positioned to press against the flank of a tooth 76 of the ratchet wheel without interference from the adjacent flank of the next succeeding tooth when the magnet 83 is energized to advance the shaft angularly by an amount equal to the angular spacing between the ratchet teeth. A spring 84 biases the armature out of engagement with the ratchet wheel. When the stepping magnet 83 is deenergized, the wiper arm 59 may be manually moved over the contact studs without interference from the armature 82. A spring 85 keeps the end 81 of the armature in positive laterally.

A pair of openings or windows 86 in the front of the box 26 is provided with signs 87 and 88 for giving information concerning transmission of the message to the operator of the transmitter 10. The signs are indicated diagrammatically in Fig. 12 and are illuminated at appropriate times by lamps 89 and 91 controlled and operated by electrical circuits to be described hereinafter.

The recording apparatus shown in detail in Figs. 5 to 10 may, as stated above, be installed at outlying points or stations more or less remote from the transmitter 10, and these receiving stations need not have an attendant present when a message is received and stored in them. The recorder 14, which is identical with the recorder 14*a* and other recorders connected to the communication circuit L, comprises a supporting frame 93 having forwardly projecting side walls 94 and a front panel 96 mounted on hinges 97, permitting the panel to be swung open to give access to the mechanism mounted within the frame and also on the inner face of the panel. Any suitable fastener or lock 98 may be employed to secure the panel in closed operative position. The paper feed mechanism supported by the panel includes a roll 99 of individual blanks 101 supported, preferably in overlapping relationship as shown in Fig. 6, on an elongated belt 102 of any suitable material, the end of the belt being secured to a mandrel 103. The belt and supported blanks are rolled together around the mandrel to form the blank supply roll 99.

The opposite ends of the mandrel 103 are supported in inclined slots in reel supporting bracket arms 106 mounted on the inner face of the hinged panel 96. A rod 107 extends between the arms and is engaged by the face of the supply reel.

As the reel is reduced in diameter through use, the mandrel will slide down the inclined slots, keeping the face of the reel in contact with the rod 107, which thus serves as a brake to prevent overrunning of the wheel after movement of the belt has ceased. A guide plate 108 extends across the width of the reel and is pivotally supported along one edge on a pivot 109. The other edge rests on the reel under the run of the belt as it is drawn off. The plate prevents any blank from following the reel rather than being drawn off with the belt. A pair of guide strips 111 directs the blanks across and over an idle roller 112 rotatably supported by brackets 114 near the top of the panel 96. From the idler roller 112 the belt 102 passes downwardly around a second idler roller 116 rotatably supported by brackets 117, through an elongated opening 118 adjacent the bottom edge of the panel, and from there to a belt take-up reel 119 rotatably mounted on the spaced arms 121 of a bracket secured to the supporting shelf 122 provided at the bottom of the panel 96 on the outside. The take-up reel is received in slots 123 in the bracket arms 121. With the above-disclosed arrangement of pivoted guide plate 108 and guide strips 111, it is not necessary to overlap the blanks on the supporting belt of the supply reel in order to feed them across the roller 112, as the plate and strips insure this operation. Nevertheless, even when the plate and strips are employed, it will usually be preferable to overlap the blanks in order to provide as many blanks as possible with a given length of belt. The arrangement of the plate 108 and inclined slots in the bracket arms 106 is such that the plate remains substantially tangent to the supply roll at all times.

The take-up reel may be driven by any suitable mechanism such, for example, as a motor 124 mounted on the outside of the panel 96 above the reel and operatively connected to it through gearing 126. The motor shaft 127 extends above the motor housing and is provided with a fan or the like 128 for ventilating and cooling the housing.

A third idler roller 129, generally similar to the idler roller 112, is mounted in brackets 131 at the bottom of the panel 96 adjacent the panel slot 118. An endless belt 132 passes over the vertically spaced idler rollers 112 and 129.

It will be apparent that the belts 102 and 132 form the moving side walls of a chute having stationary end walls 133 secured to the panel 96. The recording blanks pass down the chute to the recording mechanism which lies beneath. As illustrated, the belts diverge slightly from top to bottom. Obviously, operation of the take-up reel 119 unwinds the belt 102 and the associated blanks from the supply reel 99, drawing them over the upper idler roller 112 and the belt 132, these parts moving together. As indicated in Fig. 6, unwinding of the belt 102 and the blanks 101 releases the latter one at a time, permitting them to drop into position to be delivered to the recording cylinder under control of a phasing or framing impulse or other signal. This position is definitely determined by stops in the form of ledges 136 at the lower ends of stop fingers 137 extending downwardly from the shelf 122. A pair of cooperating fingers 138 extending downwardly from the bearing brackets 131 is located to one side of the stop fingers 137 and guides the lower edge of the blank into engagement with the stops 136.

A recording cylinder 139 is mounted on a shaft 141 rotatably supported in the side walls 94 of the frame 93. The shaft 141 is rotated from any suitable source of power such as a motor 142 through worm gear 143. A circumferential series of blank holding teeth 144 extends around the cylinder 139 near one of its ends and projects beyond its periphery a sufficient distance to pierce a blank and hold it on the cylinder in the manner described hereinafter and in the patent referred to above. The shape of the individual teeth may be varied, but a more or less saw-toothed shape has been found to be satisfactory. The transmitter cylinder 30 (Fig. 12), as stated previously, is also provided with teeth similar to the teeth 144.

A peripheral groove 146 is formed in the cylindter and receives a finger 147 secured to a rod 148 rotatably mounted in the adjacent frame side wall 94 through which it extends. The projecting end of the rod 148 carries a switch actuating arm 149 for operating a switch 151 mounted on the side wall. A torsional spring 152 surrounding the rod 148 has one end secured to the frame side wall and the other to a collar 153 which is fastened on the rod 148 for normally pressing the finger 147 into the slot 146. Obviously, when a blank is in position on the cylinder 139, the finger 147 is held out of the groove 146, thus raising the switch actuating arm 149. The function of the switch 151 will be described in connection with a description of the operation of the entire system disclosed by Figs. 12 to 14 of the drawings.

A blank 101, which is in the position shown in Fig. 6, with its lower edge resting on the ledges 136 of the two stop fingers 137, is delivered to the rotating recording cylinder 139 at the desired moment by a pusher mechanism which is illustrated as being composed of grooved rollers 154 rotatably supported on one end of a frame 156 connected to the projecting end of a core 157 of a solenoid 158 biased by tension springs 159 away from the recording cylinder. The rollers are grooved to accommodate the fingers 137. When the solenoid 158 is energized, in this instance through the medium of a phasing pulse received from the transmitter, the grooved rollers 154 are projected against the adjacent edge of the blank 101, forcing it against the teeth 144 of the rotating cylinder which pierces the blank and draws it onto the cylinder.

A frictionally driven contact brush 161 (Figs. 7 to 9) cooperating with a stationary commutator ring 162 of insulating material having a contact segment 163 controls the time of energization of the solenoid 158 in accordance with the phasing pulse received from the transmitter. The insulating commutator ring 162 is secured by suitable fastening means, such as the screws 164, to the inside surface of the left hand side frame 94. The brush 161 is mounted on a ring 165 which is adjustably secured to the driven member 166 of a frictional driving device by screw 168 (Fig. 9) projecting through arcuate slots 169. The driving member of the frictional driving device is in the form of a sleeve or bushing 170 which receives a collar 171 secured thereto by a set screw 172. The sleeve 170 is slotted at 160 to receive a set screw 167 which secures the sleeve 170 and the collar 171 to the shaft 141. The collar 171 maintains two friction members 173 and 180 in frictional driving engagement with the driven member 166 and the ring 165, respectively, by compression of a spider-shaped spring member 189. The driven member 166 is provided with a stop arm 174 which projects radially so as to engage the pivoted armature 175 of a clutch releasing magnet 176 (Fig. 5) secured on a bracket 177, which depends from the side frame 94. The angular position of the brush 161 with respect to the stop arm 174 is adjustable by loosening the screws 168. The sleeve 170 with its assembled parts may be adjusted axially of the shaft 141 by loosening the set screw 167.

A presser roller 178 (Fig. 6) is rotatably mounted on a stem 179 projecting outwardly from a bracket arm 181 supported on the side frame 94. A spring 182 draws the roller 178 yieldingly against the face of the cylinder to hold a blank 101 against twisting when it is stripped from the cylinder.

Figure 10:
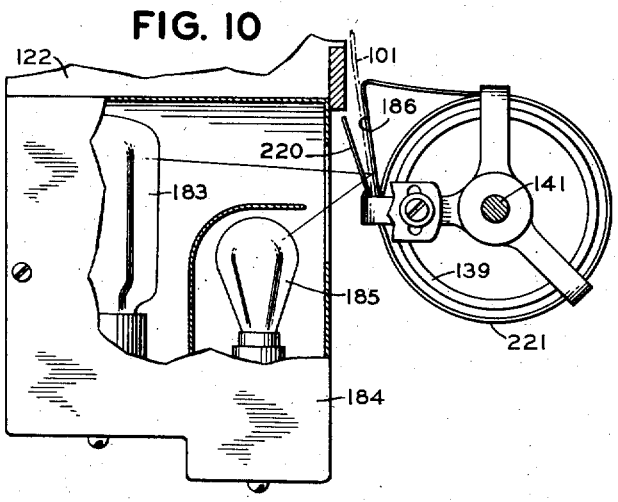
Fig. 10 is a partial section on line 10—10 of of Fig. 5.

As soon as a blank is removed from the ledges 136 of the stop fingers 137 and is delivered to the recording cylinder upon occurrence of a framing pulse, the take-up reel 119 is operated, drawing the belt 102 off the supply roll 99 until the next blank is deposited on the stop finger ledges. This serves to stop further operation of the take-up reel in a manner now to be described. The mechanism for controlling the operation of the take-up reel 119 through its motor 124 is shown in Figs. 10 and 14 as comprising a photocell 183 located in a housing 184 hung below the shelf 122 on the hinged panel 96. A lamp 185 for exciting the photocell is mounted opposite the photocell so that light directed from the lamp by a reflector 186, or other means, is cut off from the cell by the presence of a blank on the stop fingers 137. This serves to open the circuit of the take-up reel motor 124, as hereinafter described, and discontinues the feeding of another blank until the proper time.

A recording stylus 187 and its associated mechanism are mounted on and in a scanning carriage 188 which is supported for scanning movement longitudinally of the cylinder 139 on a rod 191 by a beveled roller 192 mounted in a bracket 193 secured to the bottom of the carriage. An inverted U-shaped bracket 194 on the back of the carriage slidably embraces a guide rod 195. It will be apparent that the scanning carriage 188 can be easily removed from the machine merely by lifting it off the support and guide rods and be as easily replaced. The stylus 187 is connected by a wire 196 to the projecting end of the vertically movable armature 197 of a stylus magnet 198 also mounted on the scanning carriage 188.

A half-nut 199 is located beneath the scanning carriage for vertical movement into and out of engagement with a feed screw 201, the latter of which is mounted for rotation in the frame side walls 94 and is driven from the shaft 141 of the recording cylinder 139 through gearing 202. A similar feed screw and half-nut is provided in the transmitter 10, as stated above. Other gears may be substituted for the gears 202 to vary the number of lines scanned per inch, and for this reason they are located in a readily accessible position on the outside of the frame.

Scanning movement of the carriage 188 occurs when a half-nut magnet 203 (Fig. 5), mounted on the carriage, is energized to shift the half-nut 199 into engagement with the feed screw 201. Any conventional mechanism 200 such as that shown may be employed for operatively connecting the half-nut to the magnet armature. At the end of a scanning operation the half-nut is disengaged from the feed screw and the carriage returned to its original position at the left of Fig. 5 by a carriage return spring 204 connected between the side wall 94 and the inverted U-shaped bracket 194 secured to the carriage.

Figure 11:
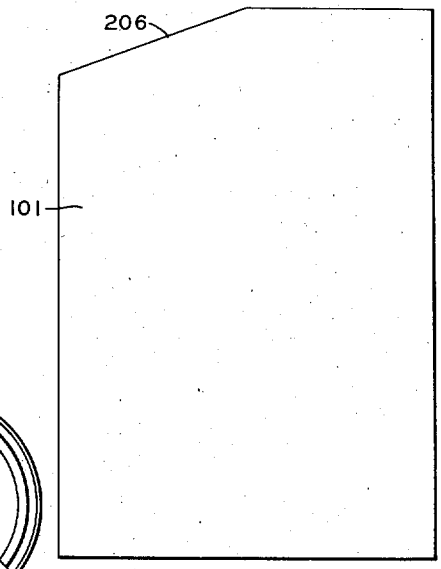
Fig. 11 shows a recording blank for use in the machine of Fig. 5.

The circumference of the recording cylinder 139 is such that, when a blank 32 is wrapped around the cylinder for scanning, its edges overlap slightly to afford a smoother path for the stylus and to keep it from touching the cylinder. Each blank has a beveled corner 206 (Fig. 11) formed in such a way that, when the blank is on the cylinder, the bevel provides an open space between the edges at one end. This space permits a stripping finger 207, extending upwardly from the armature 208 of a magnet 209, to be inserted through the open space and under a blank for the purpose of stripping it from the cylinder. The armature 208 is pivoted on a pin 211 and biased by a coil spring 212 into inoperative position. This magnet assembly is adjustably mounted in slots 214 in a bracket 216, the latter being adjustably mounted by means of slots 217 on a hanger 218 below the frame 93. By this means the stripper finger is adjustable diametrically and longitudinally of the scanning drum. A chute or other receptacle 219 (Fig. 6) receives the message blanks which are removed from the cylinder by the stripper finger. This chute may, if desired, be provided with a locked closure so that only an authorized person may have access to the recorded messages.

At the right hand end of the recording cylinder a guide plate 220 is provided for guiding the blank 101 as it is drawn onto the cylinder, and a circular guide strip 221 extends around a substantial part of the same end of the cylinder to keep the blank at that end from moving away from the cylinder.

Referring more particularly to Figs. 5 and 6, the operation of the mechanical features of the recorder thus far described will be obvious. Assuming a blank to be in feeding position on the ledges 136 of the stop fingers 137, upon receipt of a framing impulse the magnet 158 is energized, causing the presser rollers 154 to be projected to the right in Fig. 6, pressing the lower edge of the blank into engagement with the rotating cylinder 139, the teeth 144 of which penetrate the blank and cause it to be wrapped around the cylinder with its edges overlapping except at the bevel 206. Removal of the blank from the stop fingers 137 uncovers the reflector 186, permitting the lamp 185 to excite the photocell 183 to close the circuit of the paper feed motor 124, causing the take-up reel to draw the belt 102 off the supply roll 99 until the next blank has been released and drops onto the stop finger 137, cutting off light to the cell and discontinuing further blank feeding.

During the scanning operation the carriage feed screw 201 is rotated from the motor 142 through the cylinder drive shaft 141 and driving gears 202 to produce the necessary scanning movement of the carriage and stylus longitudinally of the rotating cylinder. Incoming facsimile signals cause the stylus to record the incoming messages on the blank in position on the scanning cylinder. When the scanning operation is completed, the half-nut is disengaged from the carriage feed screw, permitting the carriage to be returned to its starting position by the spring 204. Also, the stripper magnet 209 is energized, causing the stripper finger to strip the recorded blank from the cylinder.

It will be apparent that the entire blank feeding mechanism is mounted on the hinged front panel 96 and is readily accessible for adjustment or repair upon merely opening this panel. A safety switch 222 (Fig. 14) in the power line to the machine is operated to cut off power from the machine upon opening the panel.

In order that an attendant may be apprised of the fact that the supply of recording blanks is approaching the point of depletion, one expedient which is contemplated is the inclusion in the series of blanks of one having a different marking or color than the others. Such a colored blank may be placed in the supply roll so that it will be followed by a predetermined small number of other blanks before the supply is exhausted. Upon noting the appearance of such a distinctively colored blank, the attendant may make preparations for the substitution of a new supply roll of blanks in time to prevent the recorder from becoming disabled by reason of the exhaustion of the supply of recording blanks.

The operation of the system will be described in conjunction with Figs. 12 to 14 of the drawings taken together. It is assumed that the equipment shown by these three figures is idle and that the alternating current bus bars A and B at the transmitting and receiving apparatus are connected to a source of power. An operator at the transmitter desiring to send one or more copies of a message to one of the recorders 14 operates the handle 69 of the copy selecting and starting switch 17 to the position marked "dial," operating a relay 224 by reason of a circuit extending from the B bus bar through the collector ring 63, the brush arm 62, the wiper arm 59, one of the contact studs 61, and the winding of the relay 224 to the A bus bar of the alternating current supply. A make contact 226 of the relay 224 causes energization of a relay 227 from the bus bars A and B.

The closure of the make contact 228 of the relay 227 connects the A bus bar of the alternating current source to a secondary bus bar which is labeled A'. Connected between the bus bar A' and the bus bar B are the exciter lamp 33, the driving motor 31 for the scanning cylinder 30 and the feed screw for advancing the carriage, which houses the optical scanning apparatus, and, also, the motor 37 for driving the light chopper disc 32. Also, a rectifier 229 for providing direct current signaling potentials is connected to the alternating current source. It is presumed that the amplifier 19 is at all times conditioned for operation. The exciter lamp 33 being energized, an unmodulated carrier current of maximum amplitude is generated by the reflection of the light from the cylinder 30 and is transmitted over the conductors of the communication circuit L to be employed at the selected receiving station in a manner to be described.

Another make contact 231 on the relay 224 energizes an impulse producing dialing relay 232 from the bus bar B through the impulse producing contacts 234 of the dial mechanism 16 to the secondary bus bar A'. The make contact 236 of the dialing relay 232 connects the line conductor L2 to the negative pole of the rectifier 229 by way of the break contact 237 of a relay 238 and the break contact 235 of the ground transfer relay 239. The relay 238 is deenergized at this time, since the tongue of the polar relay 24 is in its midposition. The relay 239 is also deenergized, since the circuit for its operating coil is open at a break contact 241 of the relay 224.

The dialing mechanism 16 is manipulated to transmit impulses to the polar relays 25 (Fig. 13) of the recorders on the communication circuit L in accordance with the predetermined code to select the recorder 14 with which communication is desired. These impulses in the nature of interruptions of the negative potential applied to L2 at the tongue and make contact 236 of the relay 232 operate the mechanism of a selector 243 (Fig. 13) from the tongue and contact S of the associated polar relay 25. The selector 243 is of the well-known Gill selector type which operates in response to the predetermined series of signals to close a set of contacting elements such as 244. The contacting elements 244 are normally open and close only after the operating coil 246 of the selector has been energized and deenergized in a predetermined manner in accordance with a predetermined series of signals. Power for operating the mechanism of the selector 243 is obtained through a rectifier and filter combination 247 from an alternating current source which is connected to the alternating current bus bars A and B of Fig. 13.

Upon completion of the dialing operation, the contacting elements 244 of the selector 243 are closed to energize a relay 248 from the alternating current bus bars. The first relay tongue and make contact 251 of the relay 248 connects the alternating current source to the recorder 14 by way of the operating coil of a load responsive relay 253 from which the circuit may be traced from Fig. 13 into Fig. 14 as a continuation of the bus bar B to the amplifier 254 and by way of switch 222 to the bus bar A. After the cathode heaters and filaments of the vacuum tubes in an amplifier 254 (Fig. 14) are heated, the alternating current signal generated in the photocell 18 and applied to the line conductors L1 and L2 through the condensers 20 causes operation of a relay 256 from the output of this amplifier. Through a make contact 257 of this relay the input circuit of a vacuum tube 258 is energized to cause plate current to flow in the plate circuit thereof, thereby energizing a relay 261 connected in series with the output circuit of the tube. The closure of the make contact 262 of this relay connects the bus bar A through the panel safety switch 222 to a conductor 263 which energizes the driving motor 142 for the recording cylinder 139 and the carriage feed screw 201. The resulting increased flow of current in the operating coil of the relay 253 (Fig. 13), due to the operating load of the recorder 14, causes this relay to operate so that its tongue and make contact 264 bridges the tongue and make contact 251 of the relay 248, permitting this last-named relay to be de-energized in a manner to be explained, without shutting down the recorder 14.

With a recording blank 101 on the ledges 136 of the stop fingers 137 in readiness to be applied to the recording cylinder 139, the positive pole of a suitable source of direct current signaling potential is connected to the line conductor L1 through the break contact 269 of the blank supply control relay 271, the break contact 272 of a relay 273, and the break contact 274 of the relay 261. A code disc 276 (Fig. 13) driven by a motor 277 identifies the selected recorder 14 by means of code teeth 278 which operate a pair of contacts 279 connected in the line L1. The disc 276, for each recorder connected to the communication circuit L, has a distinctive number and/or positioning of the teeth 278. A condenser 281 provides a path for the alternating current generated in the photocell 18 of the transmitter 10.

At the transmitting station the tongue of the polar relay 24 vibrates against the contact M in response to the positive potential on line L1 to sound the answer code on a buzzer 284 or other desired signaling device. The energizing circuit for the buzzer extends from the A′ bus bar through the tongue and contact M of the polar relay 24, a make contact 286 of the relay 224 to the B bus bar. The code signal which is received from the selected recorder 14 assures the operator at the transmitting station that he has obtained communication with the desired receiver.

It will be assumed that he desires to transmit two copies of a given message to the selected receiver and therefore the copy selector switch 17 will be moved from the "Dial" position to the No. 2 position. This will release relay 224 and relay 232. The de-energization of relay 232 will remove the negative potential from the line L2.

The effect at the recorder of the removal of the negative potential from line L2 is to center the tongue of the polar relay 25, thereby opening the contacts 244 of the selector 246 to release the relay 248. The code motor 277 stops and the interrupter contacts 279 are short-circuited at a break contact 288 of the relay 248.

De-energization of the relay 224 which, as just explained, occurred upon moving the switch 17 to the No. 2 position, connects the contact M of the polar relay 24 to the chute magnet 42. The chute magnet is energized at this time from the bus bar A′, through the contact M of the polar relay 24, the break contact 241 of relay 224 and a break contact 291 of a relay 292 to the bus bar B. The tongue of the polar relay 24 is on its M contact because of the positive potential applied to line L1 in the manner explained above. The "Deposit message" sign 87 is illuminated by the lamp 89 connected in parallel with the operating coil of the chute magnet 43. Energization of the chute magnet 43 withdraws the closure 41 from the upper end of the chute 29 so that the message sheet 47, having a previously inscribed message thereon, may be inserted therein, after which it is conveyed by gravity to the scanning cylinder 30.

As soon as the message sheet 47 is mounted on the scanning cylinder, the switch 48 is closed, thereby energizing the relay 292 which causes de-energization of the chute magnet 43 and extinguishes the "Deposit message" lamp 89. Thus the chute is closed to prevent the insertion of other sheets. Energization of the relay 292 connects the bus bar B to one terminal of the half nut magnet 39 through a make contact 294 of the relay 292. The other terminal of the half nut magnet is connected to the bus bar A′ through the break contact 241 of the relay 224 and the contact M of the polar relay 24. The half nut engages the feed screw thereby imparting scanning motion to the carriage 34 containing the scanning apparatus. The lamp 91 is connected in parallel with the winding of the half nut magnet which becomes illuminated to illuminate the "Message being transmitted" sign 88. The closure of a make contact 296 of the half nut magnet 39 connects the positive terminal of the rectifier 229 to the line L2 through the break contact 237 of the relay 238, a break contact 297 of the relay 232, a break contact 298 of a relay 299, and a make contact 301 of the relay 239. The relay 239 was energized at the break contact 241 of the relay 224 upon movement of the copy selector switch 17 from the "Dial" position.

At the recorder the tongue of the three-position polar relay 26 connected to the line conductor L2 moves to the contact M' in response to the positive potential applied to the conductor L2 upon energization of the transmitter half nut magnet 39. The winding of a relay 303 is thus connected between the bus bars A and B and consequently is energized to operate its contacts. A make contact 304 of relay 303 is connected to shunt the break contact 269 of the relay 271 for a purpose to be fully described hereinafter. Even though a break contact 306 of the relay 303 is opened, the primary coil of a transformer 307 is maintained energized by a circuit extending through a make contact 308 of this relay and a break contact 309 of a relay 311.

On the next succeeding revolution of the transmitter cylinder 30 following the energization of the half nut magnet 39, an area 314 (Fig. 12) on the message sheet 47, which is somewhat less light reflective than the remainder of the sheet, is scanned to generate an alternating current signal having a minimum amplitude. Reception of this signal at the recorder momentarily deenergizes the relay 256, permitting closure of a break contact 316. A circuit is thus completed for operation of the brush arm stop magnet 176 and extends from the positive terminal of a convenient source of direct current through a break contact 318 of a relay 319, the magnet 176, break contact 316 of the relay 256, and the make contact 321 of the relay 303, to ground. The armature 175 of the magnet 176 is moved from engagement with the stop arm 174 for the frictionally urged framing brush 161, and allows the framing brush to make one revolution. During this revolution the relay 311 is energized from the direct current source, the break contact 318 of the relay 319 the segment 163, and the brush 161 to ground. The closure of a make contact 323 of the relay 311 locks this relay so that upon re-operation of the relay 256 in response to alternating current signals having amplitudes greater than the minimum amplitude, the relay 311 is maintained energized independently of the relay 256. The break contact 309 of the relay 311 de-energizes the transformer 307 and extinguishes the light 185 temporarily. The closure of a make contact 324 of the relay 311 completes a circuit from a source 327 of direct current through the winding of the phasing magnet 158. This magnet actuates the rollers 154 which force the blank 101 into a position where it is gripped by the teeth 144 of the recording cylinder 139 and is thus wrapped around the cylinder in position for recording. The removal of the blank 101 from in front of the photoelectric cell 183 does not produce any result at this time because the light 185 is extinguished. As soon as the advancing edge of the recording blank reaches the arm 147, the switch 151 controlled thereby is closed. This operation connects the winding of the relay 319 between the bus bars A and B, thereby operating the contacts of this relay. The opening of the break contact 318 deenergizes the relay 311, but connected in parallel with the winding of this relay is a condenser 329 which is of sufficient size to delay the release of the contacts of this relay until the recording blank is completely mounted upon the recording cylinder 139. After this operation has been completed the contacts of the relay 311 are released, thereby deenergizing the phasing magnet 158. The closure of the break contact 309 of the relay 311 again energizes the transformer 307 and operates the light 185 to excite the photoelectric cell 183, thereby energizing the input circuit of a vacuum tube 331.

Connected in the output circuit of this tube 331 is the relay 271 which thus becomes energized to close its make contact 333, thereby connecting one terminal of the blank feed motor 124 to the bus bar B. The other terminal of this motor is connected through the make contact 262 of the relay 261 and the switch 222 to the A bus bar. The operation of this motor conveys one of the recording blanks 101 from the supply roll 99 into a position to be mounted subsequently upon the recording cylinder, in which position the light falling upon the photocell 183 is interrupted. The vacuum tube 331 thereupon becomes inoperative, releasing the relay 271 to stop the motor 124. Release of the relay 271 permits positive direct current potential to be connected through the break contact 269 of the relay 271, through a break contact 272 of the relay 273, and through the make contact 274 of the relay 261, to the line conductor L1, as stated above, to provide the acknowledging signal.

The opening of the break contact 269 of the relay 271 in response to operation of the vacuum tube 331 opens one circuit from the positive source of potential. However, this potential is not disconnected from the line conductor L1 by reason of the shunt path provided through the make contact 304 of the relay 303.

The operation of the relay 319 in response to the mounting of the recording blank upon the cylinder 139 completes a circuit from the bus bar A through a make contact 342 of this relay, through windings of the half nut magnet 203 and the stylus magnet 198 in parallel, to the bus bar B. The stylus 187 is thus moved into recording position in contact with the blank 101 and the half nut is moved into engagement with the feed screw, thereby imparting a scanning movement to the carriage.

As the facsimile signals generated at the transmitter are received at the recorder, they are applied, after inversion and amplification, to the recording blank for the reproduction of the subject matter being scanned at the transmitter. These signals also are applied to the relay 256, which will vibrate as the amplitude of the signals varies between maximum and minimum values, but the closure of the break contact 316 of this relay is ineffective to operate the relay 311, since the operating circuit of this relay is open at the break contact 318 of the relay 319. The opening and closing of the contact 257 of relay 256 alternately energizes and de-energizes the input circuit of the vacuum tube 258, but this circuit is provided with means for delaying the de-energization thereof during the interval of time that the contact 257 is open. This is accomplished by providing a condenser 343 connected between the grid of the tube and a source of negative potential. When the contact 257 is closed, this condenser is charged to a potential whereby the input circuit of the tube is energized. As soon as the contact 257 is opened, the charge on the condenser begins to dissipate through a leak resistor 344 and after the lapse of a predetermined time, the potential of the grid of the tube becomes sufficiently negative with respect to its cathode that the plate current is reduced to a value which is insufficient to maintain the relay 261 operated. However, the values of the condenser 343 and the leak resistor 344 are chosen so that the plate circuit of the tube 258 draws sufficient current during the normal operation of recording that the relay 261 remains operated.

At the transmitter, when the carriage 34 containing the scanning apparatus has advanced to the end of its movement, a normally open switch 347, operated by the carriage, is closed, thereby closing a circuit from the bus bar B through the winding of the relay 299, and a normally closed carriage operated switch 348, to the bus bar A'. Relay 299 is thus energized and locked at its make contact 349 to open its break contact 298 and thereby disconnect the positive potential from the line conductor L2. Closure of the contact 349, in addition to locking the relay 299, energizes the stepping magnet 83 of the copy selecting switch 17 to step its contact arm 59 from the No. 2 stud to the No. 1 stud.

At the recorder, the disconnection of positive potential from line conductor L2 disengages the armature of the polar relay 26 from its right hand contact M' and thereby opens the operating circuit for the relay 303. The release of this relay closes a circuit from positive potential, through a make contact 350 of the relay 319, the winding of the relay 336, and a break contact 351 of the relay 303, to ground. Operation of the relay 336 closes a circuit through its make contact 352 to connect the winding of the blank stripping magnet 209 between the bus bars A and B. The sheet containing the recording is thus removed from the cylinder 139, permitting the switch 151 to open. Relay 319 is thus released and the closure of a break contact 353 of this relay completes a circuit from the bus bar A through a make contact 354 of the relay 336, through the winding of the relay 273, and a break contact 356 of a relay 357, to the bus bar B. Relay 273 is thus operated and locked through its make contact 359. When the relay 273 is energized and locked through its own contact, positive potential is removed from the line conductor L1.

It will be noted that the operating circuit of the stripping magnet 209 includes the make contact 352 of the relay 336, which, at the time that the relay 319 is released by the opening of switch 151 controlled by the recording sheet, is de-energized by the opening of the make contact 350 of relay 319. However, a condenser 363 is provided in parallel with the winding of the relay 336 which delays the release of its contacts until after the sheet had been completely removed from the cylinder.

The removal of the positive potential from the line conductor L1 produces a response at the transmitter by the polar relay 24 whereby the armature of this relay is disengaged from its contact M to de-energize the half nut magnet 39, thereby opening the contacts 296 and permitting the return of the carriage 34 to its original position.

Energization of the relay 273 (Fig. 14) also connects negative potential through the break contact 365 of the relay 319, the make contact 367 of the relay 273 and the make contact 274 of the relay 261 to the line conductor L1.

At the transmitting station, the negative potential connected to the line conductor L1 effects operation of the tongue of the polar relay 24 to its contact S. The normally closed carriage operated switch 348 is opened upon return of the carriage 34 to its starting point which causes the relay 299 to be unlocked. The bus bar A' is connected to the winding of the relay 238 which is connected to the B bus bar via a break contact 369 of the relay 299. It is to be noted that the relay 238 cannot operate until the carriage 34 has returned to the starting position and the relay 299 has been released by opening of the switch 348. A make contact 371 of the relay 238 connects the negative pole of the direct current signaling source 299 to line conductor L2. The pole changing relay 239 is disconnected from the bus bar A' at the contact M of the polar relay 24.

At the recorder, in response to the negative potential on L2, the tongue of the polar relay 26 engages the contact S'. A circuit is thus closed for operation of the relay 357 through a break contact 370 of the relay 336, the latter being de-energized at this time. Opening of the break contact 356 of the relay 357 opens the locking circuit for relay 273, thereby releasing this relay. The opening of the make contact 367 of the relay 273 removes the negative potential from the line conductor L1. Positive potential is restored to the line conductor L1 from the break contact 269 of the relay 271.

The tongue of the polar relay 24 at the transmitter is engaged with its contact M. In this manner the half nut magnet 39 is again energized and transmission of the message will be repeated since the relay 292 remains energized because of the presence of the message sheet 47 on the cylinder 30 thereby maintaining one terminal of the half nut magnet 39 in communication with the bus bar B. The positive terminal of the rectifier 229 is again connected to the line conductor L2 in the manner explained above.

In response to the positive potential on the line conductor L2, the tongue of the polar relay 26 again engages the contact M' to energize the relay 303. The blank in position on the ledges 136 is applied to the recording cylinder 139 in register with the message sheet 47 at the transmitter. The relay 319 is operated to energize the stylus magnet 198 and the half nut magnet 203.

At the end of the second transmission of the message inscribed on the message sheet 47, the carriage operated switch 347 is again closed to energize the relay 299 and thereby disconnect positive potential from the line conductor L2. The blank stripping magnet 209 at the recorder is energized by reason of the centering of the tongue of polar relay 26 which de-energizes the relay 303 in the manner described above.

Energization of the relay 299 at the transmitter also steps the contact arm 59 of the copy selecting switch 17 from the No. 1 stud to the "off" stud. A circuit is thus established from the bus bar A' through the winding of the sheet stripping magnet 51 and the contact arm 59 to the bus bar B. As soon as the message sheet 47 has been removed from the cylinder, the switch 48 is opened, de-energizing the relay 292. One circuit for the relay 227 extending between the bus bars A and B is broken when the contact arm 59 leaves the No. 1 contact stud. This relay remains energized, however, through a make contact 374 of the relay 292 until this last-named relay is de-energized following removal of the message sheet from the cylinder. De-energization of the relay 227 disconnects power from the machine by opening the connection from the bus bar A to the bus bar A'.

The scanning apparatus which is de-energized upon release of the relay 227 no longer supplies carrier current to the line conductors L1 and L2. At the recorder the absence of carrier current causes release of the relay 256, and at a predetermined time following release of this relay, the timing apparatus associated with the input circuit of the vacuum tube 258 becomes effective to open the plate circuit and causes release of the relay 261. Opening of the contact 262 of this relay disconnects the bus bar A from the driving motor 142 and the primary winding of the transformer 307, and unlocks the relay 273. In this manner power is disconnected from the recording apparatus and it is restored to its idle condition. The load-responsive relay 253 of the selector and control mechanism 12 (Fig. 13) will be released when power is disconnected from the recorder 14 so that in order to connect power to this recorder again, it will be necessary to repeat the dialing and selecting process described above.

As a result of the operation of the transmitter 10 and the recorder 14 just described, two copies of the message inscribed on the message sheet 47 will have been deposited in the chute 219 adjacent to the cylinder 139 of the recorder 14. The person or persons for whom these messages are intended will remove them from his chute and operate a relay 376 by moving its operating knob 377 to the left as viewed in Fig. 13. This closes a pair of contacts 378 to energize a holding magnet 379 which attracts the armature 380 to maintain the contacts 378 and an additional pair of contacts 381 closed. A piece of insulating material 382 secured to the supporting spring for the armature 380 and the handle member 377 operates the relatively movable contact of each of the pairs of contacts 378 and 381 respectively. A cam disc 383, which is driven with the disc 276 from the motor 277, is provided with a cam projection 384 for closing a pair of contacts 386 once for each revolution of the disc in the example shown. The contacts 381, when closed, bridge the cam operated contacts 386 across the cam operated contacts 279. The angular relationship between the cams 276 and 383 is such that the latter will not in any way alter the signal produced by the former but will add its own characteristic signal. In the example shown, the contacts 386 will add a long dash to the series of dots produced by the contacts 279. A push button may be employed to operate the relay 376, or if secrecy is desired, a switch operated by means of a key may be employed. Also, if desired, the relay 376 may be operated by a switch arranged to be operated when a closure for the bin 219 is opened to gain access to the copy or copies of the received messages. This switch will be effectively locked against unauthorized operation in installations in which the closure is provided with a key or combination lock. The relay 376 may also be used to indicate to the operator at the transmitter that the supply of blanks 101 is low or is exhausted, or other desired information may be furnished.

At any time following transmission of a message to a selected recorder, the operator at the transmitter may check pick-up of the message at the recorder by dialing the same recorder. No message need be sent to shut down the recorder after it has been selected for this purpose. If the relay has been operated at the recorder the identifying code followed by a long dash will be received. When the operator is satisfied that the message has been picked up, the selected recorder may be shut down by moving the switch 17 to any one of the numbered positions. This will release the relay 248 (Fig. 13) at the recorder in the manner described above. A break contact 388 of this relay causes a relay 389 to be energized thereby releasing the relay 376. The switch 17 is then moved to the "off" position which will remove the carrier from the communication circuit and cause the recorder to be shut down in the manner described above.

The nature of the invention may be ascertained from the foregoing description of an illustrative embodiment thereof. The scope of the invention is defined by the appended claims.

What is claimed is:

1. In a facsimile telegraph system, a transmitter, a plurality of recorders, a communication circuit for providing facsimile communication between said transmitter and said recorders, selective means one at each of said recorders responsive to a predetermined coded calling signal for placing the recorder associated therewith in operative condition for facsimile reception, and means at said transmitter for initiating transmission of a message to a recorder when it is selectively placed in operation.

2. In a facsimile telegraph system, a transmitter and a recorder interconnected for communication, each having a sheet supporting cylinder and means for conveying singly a succession of sheets to the respective cylinders, means for operatively conditioning said transmitter to generate a carrier current, selective means at said recorder operatively to condition said recorder, and means responsive to said carrier current to maintain said recorder in operative condition.

3. In a facsimile telegraph system, a transmitter and a recorder interconnected for communication, means for operatively conditioning said transmitter to generate a carrier current, means capable of operation to transmit a coded signal to said recorder, selective means at said recorder responsive to said coded signal operatively to condition said recorder, means at said transmitter for disconnecting said coded signal transmitting means while maintaining said carrier current generating means in operation, and means responsive to said carrier current to maintain said recorder in operative condition.

4. In a facsimile telegraph system, a transmitter and a recorder interconnected for communication, respective sources of power for said transmitter and said recorder for synchronous operation thereof, means for connecting said transmitter to its source of power to render it operative for facsimile transmission by generating an alternating current, means at said transmitter for sending a coded signal to said recorder, selective means at said recorder responsive to said coded signal for connecting said recorder to its source of power to render it operative for facsimile reception, and other means at said recorder responsive to said alternating current to maintain said recorder operative.

5. In a facsimile telegraph system, a transmitter, a plurality of recorders, a communication circuit for providing facsimile communication between said transmitter and said recorders, selective means one at each of said recorders responsive to a predetermined coded calling signal for placing the recorder associated therewith in operative condition for facsimile reception, means controlled by the operation of said selective means for signaling the operative condition of the selected recorder to the transmitter, said signaling means being such as to identify the selected recorder at the transmitter, and means at said transmitter for initiating transmission of a message to a recorder when it is selectively placed in operation.

6. In a facsimile system, a transmitting machine and a recording machine interconnected for communication, said transmitting machine having apparatus for scanning subject matter, said recording machine having a blank supporting cylinder, means for holding a blank on said cylinder, means for locating a blank in predetermined feeding position adjacent said cylinder and framing means responsive to said scanning apparatus at a predetermined point in a cycle of operation for applying a blank in feeding position to said cylinder to be engaged by said sheet holding means, said framing means comprising a stationary contact and a rotatable contact rotating with said cylinder and being adjustable in angular position with respect to said cylinder whereby to vary the time of applying said blank in feeding position with respect to said predetermined point in the cycle of operation of said scanning apparatus.

7. In a facsimile system, a transmitting machine and a recording machine interconnected for communication, said transmitting machine having apparatus for scanning subject matter, said recording machine having a blank supporting cylinder, means for holding a blank on said cylinder, means for locating a blank in predetermined feeding position adjacent said cylinder and framing means responsive to said scanning apparatus at a predetermined point in a cycle of operation for applying a blank in feeding position to said cylinder to be engaged by said sheet holding means, said framing means comprising a stationary contact and a movable contact, said movable contact deriving its movement from said cylinder and being adjustable in position with respect to said cylinder whereby to vary the time of applying said blank in feeding position with respect to said predetermined point in the cycle of operation of said scanning apparatus.

8. In a facsimile system, a transmitter and a recorder, each having a scanning mechanism, means operable intermittently to convey a succession of single sheets to the mechanism of said recorder, means for operating said transmitter through a transmitting cycle and said recorder through a recording cycle to transmit and record a message and means operative automatically upon the completion of a transmitting and recording cycle to effect a repetition of said transmitting and recording cycles whereby said message may be transmitted and recorded a plurality of times.

9. In a facsimile system, a transmitter and a recorder, each having a scanning mechanism, means operable intermittently to convey a succession of single sheets to the mechanism of said recorder, means for operating said transmitter through a transmitting cycle and said recorder through a recording cycle to transmit and record a message, means operative automatically upon the completion of a transmitting and recording cycle to effect a repetition of said transmitting and recording cycles whereby said message may be transmitted and recorded a plurality of times and means for predetermining the number of successive scanning operations of said transmitter and recorder.

10. In a facsimile telegraph system, a transmitter and a recorder interconnected for communication, means at said transmitter for generating and transmitting a coded signal to said recorder, selective means at said recorder responsive to said signal for starting said recorder, means for operating said transmitter through a transmitting cycle and said recorder through a recording cycle to transmit and record a message, means operative by said transmitter upon the completion of said transmitting cycle to transmit a signal to said recorder to terminate the recording cycle and means responsive to the termination of said recording cycle to restart said transmitter for a repetition of said transmitting cycle whereby said message may be transmitted and recorded a plurality of times.

11. In a facsimile telegraph system, a transmitter and a recorder interconnected for communication, means at said transmitter for generating and transmitting a coded signal to said recorder, selective means at said recorder responsive to said signal for starting said recorder, means for operating said transmitter through a transmitting cycle and said recorder through a recording cycle to transmit and record a message, means operative automatically upon the completion of a transmitting and recording cycle to cause a repetition of said transmitting and recording cycles, and presettable means at said transmitter actuated upon each repetition of said transmitting cycle, said presettable means being operative up a predetermined number of actuations thereof to terminate operation of said transmitting mechanism.

12. In a facsimile telegraph system, a transmitter and a recorder interconnected for facsimile communication, means at said recorder operable to produce a repeat signal, a stepping switch at said transmitter, means for manually setting said switch to any desired position away from its home position, said switch being responsive to said repeat signal from said recorder so as to be stepped towards the home position with each successive operation of said repeat signaling means and means operative by said stepping switch when it reaches said home position to effect stopping of said transmitting mechanism.

13. In a facsimile telegraph system, a transmitter and a recorder interconnected for facsimile communication, means operable at said transmitter to produce an end-of-message signal, means at said recorder operable in response to said end-of-message means for transmitting a repeat signal to said transmitter, and a stepping switch at said transmitter responsive to said repeat signal from said recorder to be stepped toward the circuit opening position with each successive operation of said end-of-message signaling means, means for presetting said switch a variable number of steps from said open circuit position and means operated by said switch when it reaches said open circuit position for interrupting operation of said transmitter.

14. In a facsimile telegraph system, a transmitter, a plurality of recorders, a communication circuit interconnecting said recorders with said transmitter, selective means at each of said recorders responsive to a coded signal from said transmitter for connecting the recorder with which said selective means is associated to said communication circuit, means at said transmitter for producing coded signals, a combined switch at said transmitter for starting said transmitter and rendering said coded signal generating means operable for use when said switch is in one position, and control means for causing said transmitter to operate to transmit subject matter to a selected recorder when said switch is in another position.

15. In a facsimile telegraph system, a transmitter, a plurality of recorders, a communication circuit interconnecting said recorders with said transmitter, means at said transmitter for producing coded signals, selective means at each of said recorders responsive to a predetermined coded signal from said transmitter for connecting the recorder with which said selective means is associated to said communication circuit, a switch at said transmitter, means operative when said switch is in one position for starting said transmitter and rendering said coded signal generating means operable for transmission of coded signals to said receivers, controlling means operative when said switch is in another position for causing said transmitter to operate to transmit facsimile subject matter to a selected recorder and means operative when said switch is in a third position to render said transmitter inoperative.

16. In a facsimile telegraph system, a plurality of facsimile receivers of the type which are self-supplied with recording paper one sheet at a time, said receivers being associated with a facsimile transmitter for communication purposes, means to selectively obtain communication between said transmitter and any one of said receivers, and means to control the supplying of recording paper to the receiver obtained for communication.

17. A facsimile telegraph system including a communication channel adapted for the transmission of facsimile and selector control signals thereover, a plurality of facsimile recorders associated with and available for facsimile reception from said channel, a central office transmitter connected to said channel adapted for selective transmission to any one of said recorders at a time, and a selector mechanism responsive to an electrical characteristic of said channel associated with each recorder for initiating operation thereof to record facsimile signals.

18. In a facsimile telegraph system, a communication channel, a plurality of stations interconnected for communication over said channel, respective sources of power for said stations for synchronous operation thereof, means for connecting one of said stations to its source of power to render it operative for facsimile communication purposes, means at said one station for sending a coded signal over said channel, and selective means at said other stations responsive to said coded signal for selectively connecting said other stations to their source of power to render them selectively operative one at a time for facsimile reception.

19. In a facsimile telegraph system, a communication channel, a plurality of stations interconnected for communication over said channel, respective sources of power for said stations for synchronous operation thereof, means for connecting one of said stations to its source of power to render it operative for facsimile communication purposes, means at said one station for sending a coded signal over said channel, selective means at said other stations responsive to said coded signal for selectively connecting said other stations to their source of power to render them selectively operative one at a time for facsimile reception, and means at said other stations to maintain said other stations operative.

GARVICE H. RIDINGS.
RALEIGH J. WISE.